United States Patent [19]

Pintsov et al.

[11] Patent Number: 5,612,889
[45] Date of Patent: Mar. 18, 1997

[54] MAIL PROCESSING SYSTEM WITH UNIQUE MAILPIECE AUTHORIZATION ASSIGNED IN ADVANCE OF MAILPIECES ENTERING CARRIER SERVICE MAIL PROCESSING STREAM

[75] Inventors: Leon A. Pintsov, West Hartford; Robert A. Cordery, Danbury, both of Conn.

[73] Assignee: Pitney Bowes Inc., Stamford, Conn.

[21] Appl. No.: 317,515

[22] Filed: Oct. 4, 1994

[51] Int. Cl.$^6$ ........................................ G06F 19/00
[52] U.S. Cl. ................. 364/478.14; 364/478.15; 364/478.03
[58] Field of Search .................. 364/478, 464.01, 364/464.02, 464.03, 464.04, 406, 479, 478.03, 478.07–478.15; 380/23, 51, 55

[56] References Cited

U.S. PATENT DOCUMENTS

| | | |
|---|---|---|
| 3,978,457 | 8/1976 | Check, Jr. et al. . |
| 3,995,741 | 12/1976 | Henderson . |
| 4,117,975 | 10/1978 | Gunn . |
| 4,168,533 | 9/1979 | Schwartz . |
| 4,201,339 | 5/1980 | Gunn . |
| 4,301,507 | 11/1981 | Soderberg et al. . |
| 4,493,252 | 1/1985 | Clark . |
| 4,579,054 | 4/1986 | Buan et al. . |
| 4,725,718 | 2/1988 | Sansone et al. . |
| 4,757,537 | 12/1988 | Edelmann et al. . |
| 4,775,246 | 2/1986 | Edelmann et al. . |
| 4,796,193 | 1/1989 | Pitchenik . |
| 4,831,555 | 5/1989 | Sansone et al. . |

(List continued on next page.)

FOREIGN PATENT DOCUMENTS

| | | | |
|---|---|---|---|
| 1301306 | 7/1987 | Germany ...................... | G07B 17/00 |
| 1383518 | 1/1972 | United Kingdom . | |
| 2193160 | 2/1988 | United Kingdom . | |
| 0604147A2 | 12/1993 | United Kingdom ........... | G07B 17/00 |
| 2271452 | 4/1994 | United Kingdom . | |

WO89/01831 3/1989 WIPO .

*Primary Examiner*—Paul P. Gordon
*Assistant Examiner*—Thomas E. Brown
*Attorney, Agent, or Firm*—Charles R. Malandra, Jr.; Melvin J. Scolnick

[57] ABSTRACT

A mailing list is created including destination addresses for mailpieces to be submitted to a carrier service for delivery. A unique mailpiece identifier associated with mailpieces on the mailing list is generated by the carrier or other trusted third party. The unique mailpiece identifier is printed on the mailpiece with which it is associated. The mailpieces with the printed unique identifier are submitted to the carrier service. The carrier service obtains the printed unique identifier from the mailpiece. The obtained unique identifier from each said mailpiece is utilized to verify that data associated with the mailpiece has been processed by the carrier or trusted third party. When the unique number has been obtained from the mailpieces, the carrier service, if desired, may note this fact in the carrier records to prevent reuse of the unique identifier. The carrier service as part of issuing the unique identification may: charge the mailer's account of other fund depository for the carrier service charges associated with the mailpiece; and/or, assign a destination delivery code; and/or, provide address hygiene for the mailpiece; and/or change of address processing. When the unique identifier is obtained from the mailpiece, a delivery point destination code may be printed on the mailpiece, based on the corrected address. As an alternative, the destination delivery code may be provided to the mailer with the unique mailpiece identifier to be printed on the mailpiece by the mailer. Various cryptographic techniques may be employed to authenticate the mailer and the carrier service and to protect the transmitted information between the parties. The payment for the carrier services can be implemented prior in time to the entry of the mailpieces to the carrier service mailstream. Unauthorized mailpieces may be out sorted early in the carrier service processing procedure.

14 Claims, 7 Drawing Sheets

U.S. PATENT DOCUMENTS

| | | |
|---|---|---|
| 4,873,645 | 10/1989 | Hunter et al. . |
| 4,999,481 | 3/1991 | Baer et al. . |
| 5,008,827 | 4/1991 | Sansone et al. . |
| 5,019,991 | 5/1991 | Sansone et al. . |
| 5,050,078 | 9/1991 | Sansone ................................ 364/406 |
| 5,142,482 | 8/1992 | Sansone et al. . |
| 5,161,109 | 11/1982 | Keating et al. ......................... 364/478 |
| 5,280,531 | 1/1994 | Hunter . |
| 5,293,319 | 3/1994 | DeSha et al. . |
| 5,308,932 | 5/1994 | Manduley et al. . |
| 5,319,562 | 6/1994 | Whitehouse . |
| 5,329,102 | 12/1994 | Sansone . |
| 5,448,641 | 9/1995 | Pintsov et al. ........................... 380/51 |

FIG. 3
MAILING IDENTIFICATION FILE 122

| ACCOUNT # 12345678901 302 | DATE - AUGUST 13, 1994 303 |
|---|---|
| ADDRESS | RATE (OR RATING PARAMETERS) |
| 304 → 1. PITNEY BOWES<br>35 WATERVIEW DRIVE<br>SHELLON 06484 | 310 ⎴ 306 ⎴ ERROR CORRECTION CODE<br>12345678 00001 41 75 — 316   0.32<br>MAILER — 314<br>ID  MAIL PIECE  312  # OF CHARACTERS<br>COUNT       IN THE ADDRESS |
| 2. J. DOER<br>765 PROSPECT AVE.<br>CHICAGO, IL 61277 | 12345678000023383   0.53 |
| ⋮ | ⋮ |
| 357. USPS<br>8403 LEE HIGHWAY<br>MERRIFIELD, VA 22082 | 13245678003573512   0.19 |
| TOTAL POSTAGE $157 — 318 | |
| PROVIDER'S DIGITAL SIGNATURE<br>320 | |

FIG. 4
MAIL PROCESSING FILE 124

| IDENTIFICATION NUMBER | DELIVER POINT POSTAL CODE |
|---|---|
| 306 | 402 |
| 1. 12345678000014175 | 06484  8000  00<br>404    412   414 |
| 2. 12345678000023383 | 60677  1028  65<br>406    408   410 |
| 357. 12345678003573512 | 22082  8101  03 |

FIG. 5
MAIL GENERATION

FIG. 7
DATA CENTER MAILING LIST PROCESSING

MAIL PROCESSING SYSTEM WITH UNIQUE MAILPIECE AUTHORIZATION ASSIGNED IN ADVANCE OF MAILPIECES ENTERING CARRIER SERVICE MAIL PROCESSING STREAM

FIELD OF THE INVENTION

The present invention relates to mail processing systems, and more particularly, to mail processing systems employing a unique mailpiece authorization for each mailpiece of a series of mailpieces. The authorization, such as a unique identifier, is assigned in advance of delivery of the mailpieces to the carrier service and is used by the carrier service in processing the mail.

BACKGROUND OF THE INVENTION

In mail preparation, a mailer prepares a mailpiece or a series of mailpieces for delivery to a recipient by a carrier service such as the United States Postal Service or other postal service or a private carrier delivery service. The carrier services, upon receiving or accepting a mailpiece or a series of mailpieces from a mailer, processes the mailpiece to prepare it for physical delivery to the recipient. Part of the carrier service processing includes reading the addresses on the mailpieces, sorting the mailpieces for delivery and determining that carrier service charges have been paid by the mailer.

Part of mail preparation has included rating and postage payment. Postage payment systems have been developed employing postage meters, which are mass produced devices for printing a defined unit value for governmental (such as tax stamps, or postage stamp) or private carrier delivery of parcels and envelopes. These postage meter systems involve both prepayment of postal charges by the mailer (prior to postage value imprinting) and post payment of postal charges by the mailer (subsequent to postage value imprinting). Postal charges (or other terms referring to postal) as used herein should be understood to mean charges for either postal charges, tax charges, or private carrier charges or the like (or postal service, tax service or private carrier service, as the case may be).

Some of the varied types of postage metering systems are shown, for example, in U.S. Pat. No. 3,978,457 for MICROCOMPUTERIZED ELECTRONIC POSTAGE METER SYSTEM, issued Aug. 31, 1976; U.S. Pat. No. 4,301,507 for ELECTRONIC POSTAGE METER HAVING PLURAL COMPUTING SYSTEMS, issued Nov. 17, 1981; and U.S. Pat. No. 4,579,054 for STAND ALONE ELECTRONIC MAILING MACHINE, issued Apr. 1, 1986. Moreover, other types of metering systems have been developed which involve different printing systems such as those employing thermal printers, ink jet printers, mechanical printers and other types of printing technologies. Examples of these other types of electronic postage meters are described in U.S. Pat. No. 4,168,533 for MICROCOMPUTER MINIATURE POSTAGE METER, issued Sep. 18, 1979 and, U.S. Pat. No. 4,493,252 for POSTAGE PRINTING APPARATUS HAVING A MOVABLE PRINT HEAD AND A PRINT DRUM, issued Jan. 15, 1985. These systems enable the postage meter to print variable information, which may be alphanumeric and graphic type information.

Postage metering systems have also been developed which employ encrypted information on a mailpiece. The postage value for a mailpiece may be encrypted together with other data to generate a digital token. A digital token is encrypted information that authenticates the information imprinted on a mailpiece such as postage value. Examples of postage metering systems which generate and employ digital tokens are described in U.S. Pat. No. 4,757,537 for SYSTEM FOR DETECTING UNACCOUNTED FOR PRINTING IN A VALUE PRINTING SYSTEM, issued Jul. 12, 1988; U.S. Pat. No. 4,831,555 for SECURE POSTAGE APPLYING SYSTEM, issued May 15, 1989; U.S. Pat. No. 4,775,246 for SYSTEM FOR DETECTING UNACCOUNTED FOR PRINTING IN A VALUE PRINTING SYSTEM, issued Oct. 4, 1988; U.S. Pat. No. 4,873,645 for SECURE POSTAGE DISPENSING SYSTEM issued Oct. 10, 1989 and, U.S. Pat. No. 4,725,718 for POSTAGE AND MAILING INFORMATION APPLYING SYSTEMS, issued Feb. 16, 1988. These systems, which may utilize a device termed a Postage Evidencing Device (PED), employ an encryption algorithm which is utilized to encrypt selected information to generate the digital token. The encryption of the information provides security to prevent altering of the printed information in a manner such that any change in a postal revenue block is detectable by appropriate verification procedures.

Encryption systems have also been proposed where accounting for postage payment occurs at a time subsequent to the printing of postage. Systems of this type are disclosed in U.S. Pat. No. 4,796,193 for POSTAGE PAYMENT SYSTEM FOR ACCOUNTING FOR POSTAGE PAYMENT OCCURS AT A TIME SUBSEQUENT TO THE PRINTING OF THE POSTAGE AND EMPLOYING A VISUAL MARKING IMPRINTED ON THE MAILPIECE TO SHOW THAT ACCOUNTING HAS OCCURRED, issued Jan. 3, 1989; U.S. Pat. No. 5,293,319 for POSTAGE METERING SYSTEM, issued Mar. 8, 1994; and, U.S. patent application Ser. No. 882,871, for POSTAGE PAYMENT SYSTEM EMPLOYING ENCRYPTION TECHNIQUES AND ACCOUNTING FOR POSTAGE PAYMENT AT A TIME SUBSEQUENT TO THE PRINTING OF POSTAGE filed Jul. 7, 1986 by Wojciech M. Chrosny and assigned to Pitney Bowes, Inc., or its Canadian Counterpart patent No. 1 301 336.

Other postage payment systems have been developed not employing encryption. Such a system is described in U.S. Pat. No. 5,319,562 for SYSTEM AND METHOD FOR PURCHASE AND APPLICATION OF POSTAGE USING PERSONAL COMPUTER. This patent describes a system where end-user computers each include a modem for communicating with a computer at a postal authority. A secure nonvolatile memory for storing postage and remaining postage. The system is operated under control of a postage meter program which causes communications with the postal authority to purchase postage and for updating the contents of the secure nonvolatile memory. The postage printing program assigns a unique serial number to every printed envelope and label, where the unique serial number includes a meter identifier unique to that end user. The postage printing program of the user directly controls the printer so as to prevent end users from printing more than one copy of any envelope or label with the same serial number. It is asserted in the patent that by capturing and storing the serial numbers on all mailpieces, and then periodically processing the information, the postal service can detect fraudulent duplication of envelopes or labels. In this system, funds are accounted for by and at the mailer site. The mailer creates and issues the unique serial number which is not submitted to the postal service prior to mail entering the postal service mail processing stream. Moreover, no assistance is provided to enhance the deliverability of the mail beyond current existing systems.

SUMMARY OF THE INVENTION

Payment to a carrier service is securely protected due to the fact that the present invention provides for carrier service authorization for mail prior to the actual mail deposit of the mailpieces into postal stream. Moreover, if desired, only mailpieces that were pre-paid or pre-approved are accepted at the time mailpieces are delivered to and processed by the carrier service. Others mailpieces may be rejected during the processing step, as for example, by a bar code reader/sorter system or by other suitable equipment. Thus, the system provides for a high level of payment security because mailpieces are prepaid or pre-approved or authorized by the carrier prior to deposit into the postal stream.

In addition to the above, where desired appropriate security measures that are based on cryptographic techniques can be applied to provide protection against intercept of transmitted mailing lists, identification numbers and other data communicated between the mailer and the carrier service. This protects against, for example, the identification numbers for mailing list submitted by a mailer being intercepted by another mailer and used by the other mailer where the mailing list contains addresses desired by the other mailer. In such case, mailpieces with identical identification numbers could be submitted to the carrier service. In this case a dispute could arise as to which mailer has actually paid the postage. Alternatively, it may require additional recordkeeping activity by the carrier service. Any such attempt, however, at this type of interception and impersonation is avoided by the cryptographic protection.

Systems and methods embodying the present invention involve creating a mailing list including destination addresses for mailpieces to be submitted to a carrier service for delivery. A unique mailpiece identifier associated with mailpieces on the mailing list is generated by the carrier service. The unique mailpiece identifier is printed on the mailpiece with which it is associated. The mailpieces are submitted with the printed unique identifier to the carrier service. The carrier service obtains from the mailpiece the printed unique identifier. The obtained unique identifier from each said mailpiece is utilized to verify that data associated with the mailpiece has been processed by the carrier service.

In accordance with a feature of the present invention when the unique identifier has been obtained from the mailpieces, the carrier service may note this fact in the carrier records to prevent reuse of the unique identifier.

In accordance with yet another feature of the present invention, the carrier service as part of issuing the unique identification may: charge the mailer's account or other fund depository for the carrier service charges associated with the mailpiece; and/or, assign a destination delivery code; and/or, provide address hygiene for the mailpiece. The destination delivery code may be provided to the mailer, if desired, for printing on the mailpiece or may be printed on the mailpiece by the carrier when processing the mail. Alternatively, the destination delivery code maya be associated with the unique identifier and used to process the mail without printing the destination delivery code on the mailpiece.

BRIEF SUMMARY OF THE DRAWINGS

Reference is now made to the following Figures wherein like reference numerals designate similar elements in the various views, and in which.

DETAILED DESCRIPTION OF THE PREFERRED EMBODIMENT

I. General Background

A mailing list is created including destination addresses for mailpieces to be submitted to a carrier service for delivery. A unique mailpiece identifier associated with mailpieces on the mailing list is generated by the carrier or other trusted third party. The unique mailpiece identifier is printed on the mailpiece with which it is associated. The mailpieces are submitted with the printed unique identifier to the carrier service. The carrier service obtains from the mailpiece the printed unique identifier. The obtained unique identifier from each said mailpiece is utilized to verify that data associated with the mailpiece has been processed by the carrier or trusted third party. When the unique number has been obtained from the mailpieces, the carrier service, if desired, may note this fact in the carrier records to prevent reuse of the unique identifier. The carrier service as part of issuing the unique identification may: charge the mailer's account or other fund depository for the carrier service charges associated with the mailpiece; and/or, assign a destination delivery code; and/or, provides address hygiene for the mailpiece; and/or change of address processing. When the unique identifier is obtained from the mailpiece, a delivery point destination code may be printed on the mailpiece, based on the address hygiene address. As an alternative, the destination delivery code may be provided to the mailer with the unique mailpiece identifier to be printed on the mailpiece by the mailer. Various cryptographic techniques may be employed to authenticate the mailer and the carrier service and to protect the transmitted information between the parties. The payment for the carrier services can be implemented prior in time to the entry of the mailpieces to the carrier service mail stream. Unauthorized mailpieces may be out sorted early in the carrier service processing procedure.

It should be expressly noted, that the preferred embodiment employs assignment of unique identification numbers to mailpieces by the carrier. However, many advantages of the present invention can be achieved when the mailer assigns identification numbers and communicates them together with mailing list to the carrier in advance of mail submission.

If the mailer generates the unique identifiers, the carrier service depends on the diligence of the mailer to send the unique identifiers before submitting the mailpieces. The carrier service further must verify the uniqueness and the validity of the identifier and that payments to the carrier by the mailer have been accounted for.

It should be expressly recognized that a trusted third party can act as a representative for the carrier service where desired. The trusted third party can do all or some of the functions provided by the carrier service. It should also be expressly noted that the term "carrier service" as used herein also means trusted third party. It is intended to cover the carrier service alone, or the carrier service and/or the trusted third party or the trusted third party alone. Additionally, a "mailpiece" as used herein includes letters and parcels which may have information printed directly thereon or have information printed on a mailing tape or label adhered thereto.

a. Authentication of the Mailer and of the Carrier Service

Where desired, mailer's authentication can be achieved by employing a public key cryptosystem. In this case each mailer which become a subscriber to this service receives a private key. Protection of such private key is a responsibility of the mailer. Such a private key has a corresponding unique public key which is stored in a data base that is maintained by a provider of the service such as a carrier service or a post. These public keys can also be protected if needed since only the carrier service need know them. In practice, the carrier may issue to the user or mailer a portable storage device that contains 500 bit-1,000 bit private key (e.g. a smart card). The user may employ a smart card reader operatively connected to a mail generating computer and capable of obtaining the private key from the portable storage device. In this case, encryption and decryption of the data is performed by the mail generating computer. Other arrangements are possible as well. For example, a user may employ a secure co-processor that securely stores the private key and executes all cryptographic transformations and communicates results to the mail generating computer. Similarly, the carrier may employ a private key securely stored in a tamper resistant secure co-processor. All mailers/subscribers have access to the corresponding carrier's public key. Mutual authentication between a mailer and the carrier can be arranged by using this public key cryptographic system.

When a mailer initiates a communication session with the carrier over a public network, the carrier can send a unique number in plaintext to the mailer. The mailer then can encrypt the plaintext with the mailer's private key and send the resulting cipher text to the carrier. The carrier then decrypts the cipher text and compares the result with the initial plaintext. If this comparison results in a match, it authenticates the mailer to the carrier and also helps establish "non-repudiation" feature if desired. That is, the mailer is authorizing the provider to deduct a certain amount of postage or funds from the mailer's account through appropriate credit or debit arrangements. Similarly, the carrier may send a pair of numbers (plain text and cipher text) that authenticate the carrier to mailer. This also establishes "non-repudiation" since the carrier thus acknowledges acceptance of certain kind of data indicative of an upcoming mailing.

b. Privacy of the Data Communicated Between the Mailer and the Carrier Service

It is desirable in some cases to protect the privacy of the data communicated between the mailer and the carrier. Specifically, mailing lists of customers or mailing financial data can be considered as confidential information and may even be strategically important information. It thus should desirably be protected against such interception. This can be arranged by an appropriate key exchange mechanism between the mailer and the provider. For example, Diffie-Hellman or RCA key exchange (see standard X9.31-199x, Public Key Cryptography Using Reversible Algorithms for the Financial Services Industry, Part 4, Transportation of Symmetric Algorithm Keys Using RSA). In this case, the mailer and the provider establish a secret session key which both parties use to protect sensitive information. The mailer encrypts its mailing list with this secret key and the provider encrypts a list of unique identification numbers for addresses in the mailing list. This provides protection against an impersonation attack and the mailer gets an "electronic non repudiatable receipt" for the mailing. This provided tangible evidence of the transaction in case of any dispute requiring proof of the transaction. Examples include certified, registered, insured and other special mail and delivery services. It may also provide evidence in matters such as tax disputes regarding the mailer's expenses.

c. Mail and Parcel Types

All types and classes of mail, including but not limited to parcel mail, overnight mail, flats and irregular parcel pieces can be processed with the present system. Mail which is not machinable, i.e. that is not processable by bar code sorters and automatic flat sorters or other scanning/sorting equipment (e.g. parcels, large express mail envelopes and irregular parcel pieces ), can be scanned for unique identification numbers with a hand held scanner or other suitable device. The processing throughput for such mail may be slower, however, the volumes are usually less than that for machinable mail.

d. Postage Payment

Postal accounting and/or payment is simplified and streamlined by paying or approving in advance (by the carrier service) mail to be put into the mail stream. This provides significant advantage in labor savings, administrative expenses and accuracy. Presently, many existing postal and carrier service accounting systems involve multiple, diversified payment systems, such as retail counters, permit mail, metered mail, etc. All the accounting data has to be entered, often manually processed, and reconciled at the end of every accounting period. The present system, due to is nature, allows all financial information to be computer processed, which is usually the fastest and most efficient way of handling such data.

e. Operation of the System

According to the present system each mailpiece has a unique identifier such as an identification number assigned by the carrier service prior to preparation of the mailpiece. Desirably the identifier is printed in a high readable format such as a robust bar code with an appropriate level of redundancy. This virtually guarantees reading of even poorly printed mail. However, since the present system is particularly suited to computer generated mail, the print quality is expected to be high. This unique identifier can serve as a basis for track and trace capability and for providing special services such as certified, insured or registered mail.

II. The Mailer

Mailer's gain significant advantages from the present system.

1) Less expensive service. The carrier service, if it so desires, will be able to pass its significant cost savings to mailers. This also includes flexible and easily discountable rate structures.

2) Higher reliability of service. The present system provides for a unique identifier on every mailpiece, thus making it more readily traceable and results in higher reliability.

3) Mail prepared and processed according to the present system bypasses several processing steps and can have the highest possible address quality (including forwarding of change-of-address mail as explained below). Thus, mail delivery should be significantly faster. Knowledge by the carrier service of upcoming mail distribution prior to actual mail processing should allow for scheduling of processing equipment and transportation and should reduce delivery time.

4) Special mail services integrated with regular mail generation can be especially important to mailers. This provides a significant advantage over electronic messaging. The present system allows, for example, for natural integration of certified, registered, insured, etc., mail into regular mail stream generation and processing. This also reduces delivery time and expense.

The present system has additional advantages with respect to forwarding change-of-address mail. Most of the carrier service existing process is a largely manual and very expensive operation with delays in the delivery of the mail. In the United States, at the present time a person or organization that has changed its address, files a change of address request with the local post office which is kept by the local post office. In the United States this retention period is 18 months. The period of retention time varies in the other countries. The 18 months period can be extended for up to one year. Forwarding of first class mail is done free of charge to mailers. The manual forwarding process works as follows. All mail collected during the day for an old address is relabeled with a semiautomatic machine run by an operator. Special labels with the new address is applied to the mailpiece beneath the old address. The mail is sent back for further processing into mail processing facility such as a General Mail Facility (GMF). The cost to the United States Postal Service of such operation is very high because of all the handling and processing involved.

The present system overcomes the difficulty of forwarding change-of-address mail for all mail subject to conditions of the present system. Upon receiving a change-of-address notification from a recipient the carrier service enters the new address into its computer. This data is automatically communicated to carrier service data centers and is now from a mailer, the list is cleaned and hygienized. A Data Center linked with the old address. When the mailing list for upcoming mail is received computer searches all addresses and assigns a new delivery point postal code (DPPC) such as an 11 digit zip code for all change-of-address entries. The mailpiece identifier and delivery point postal code list that is available on line and in real time to mail processing equipment (e.g. bar code sorters) now has updated delivery information automatically. Thus, change-of-address mail never reaches the old, incorrect destination, but is intercepted at a very early point in the mail processing cycle and reaches its correct destination earlier and at very little cost to the carrier service. New updated address information can be provided to mailers (for a fee) if so desired by the carrier service making it an additional source of revenue for the carrier.

III. Carrier System

Many of the mailer benefits described above also benefit the carrier service. In addition, however, the present system eliminates the need for complex and costly acceptance procedures. The mail is accounted and paid for automatically. Rate verification, however, remains desirable since the charges for the mail are calculated based on the mailer submitted information (not the physical mail itself). Rate verification can be done automatically depending on relevant rating parameters. If these are weight and size, bar code sorter (or other suitable mail processing equipment) would have to be modified to measure weight and size of mailpieces. In this case the data file available for on line real time inquiry by mail processing equipment would have an additional entry for each unique ID, namely postage paid. Verification may be employed using the principles described in the co-pending patent application of Pintsov, et al., Ser. No.; 133,398, filed Oct. 8, 1993 for POSTAL RATING SYSTEM WITH VERIFIABLE INTEGRITY and assigned to Pitney Bowes Inc., the entire disclosure of which is hereby incorporated by reference.

The present system provides an opportunity, if desired, for rating mail based on the distance between origination and destination points. This can be important when a carrier service may desire to charge for the service based on the actual cost or value which may be a function of distance. If required for a carrier service, this rating approach prevents the so called "cream skimming" that offers low priced delivery in the most profitable densely populated areas, avoiding remote and sparsely populated areas. This distance rating or so called "zone based rating" can be done automatically without reading the destination address. Since the destination address list is submitted by the mailer, zone based charges are computed with great ease. Also, any special discounts can easily be provided.

The present system automatically enables the carrier to collect very valuable information about upcoming mail volume and geographical distribution ahead of time and at no cost. This information is a by-product of the present system and can serve to optimize mail flow and minimize cost.

The present system allows the carrier to avoid a costly and complex process of destination address reading. The existing transition in the mailer and carrier facility, typical for computer generated mail is: Address Electronic Data→Address Print Image→Address Electronic Image→Address Electronic Data; and it is completely avoided. In the present system address data is never transformed from a printed image to the electronic domain such as an ASCII file. This eliminates costly transformations which can be a source of errors in processing mail. For mailers, this makes it possible to print very personalized and stylized addresses (since they need not be scanned). It also makes it possible to use special multicolor graphics on envelopes for promotional or advertising mail. Since address information does not have to be scanned the imaging characteristics of the mailing envelope do not affect mail processing.

There is typically at least several hours between the moment mail is printed by the mailer and the moment when mail is delivered to the carrier and mail processing begins. This time can be used to correct addresses, produce and consolidate logistical information, arrange for special deliveries, etc. Since no real-time processing is required, less complex and costly computing equipment can be used.

As an option address cleansing can be done on-line and in real-time. In this case all mail which is undeliverable as addressed can be determined and corresponding data can be communicated back to the mailer. This benefit may be a significant option and can be offered to mailers for an additional fee. Deliverable mail (even where the address is not fully complete and/or accurate) can be addressed correctly during the several available hours. Corrected addresses may also be sent to the mailer off-line for incorporation in future mailings. The situation with the preferred embodiment from the mailers point of view (off-line not real time cleansing) is no worse than the situation today. Mailers submit undeliverable as addressed mail and it is being processed until the determination made that is undeliverable. The present system, however minimizes processing costs for undeliverable mail. This mail can be intercepted by the mail processing equipment at a very early stage in mail processing by the carrier service, providing significant advantage compared to the existing system. The length of time to immediately provide a correct address list to the mailer, if desired, depends on the size of the mailing list involved, the size of the data base, the type of computing equipment, the load by other mailers on the system and the like.

There is no need for the costly distribution of updated address data bases to the mailers and there is no need for intermediaries in this process. The most up to date information is automatically sent from local sources to the carrier service data center(s) where it is automatically incorporated and utilized in processing the mail.

Moreover, with the present system mail can be deposited anywhere in the country without local deposit rule restrictions. For example, in the United States, the existing regulations require that mail metered by a mailer has to be deposited in the locality of the post office where the postage meter is registered. This is to help the postal service to reconcile meter usage and postage purchased. Comparable restrictions apply to permanent mailings.

The present system additionally avoids address reading by postal processing equipment. Instead it relies on unique mailpiece identifier that is unambiguously linked by the carrier service to a destination delivery code for each address. Thus, problems associated with reading addresses from mailpieces are totally avoided. This is a major advantage to carrier services. It is also a great advantage to mailers since processing and delivery of the mail may be expedited.

Digital signatures (which include cryptographic hashing) can be provided for files communicated between the carrier service data center and mailer's computer. However, one cannot completely exclude the possibility that the mailpiece unique identifier and its associated address can fall out of synchronization, i.e. mailpiece identifiers would be printed on a mailpiece with the address different than was intended by the mailer. The present system overcomes this difficulty by including, if desired, the number of characters in the destination address into mailpiece ID (except blanks and punctuation signs). Mail generating and processing equipment are able to determine a total number of characters in the address and compare it with the number of characters indicated in the mailpiece identifier thus providing assurance that the synchronization is in order. Other mechanisms to assure synchronization between Mailpiece identifier and the destination address are possible as well. One example would be to count the number of lines in the address or using the first alpha numeric on each line of the destination address. For added assurance, OCR can be used to confirm that the printed address matches the address for which authorization has been granted.

IV. Organization and Operation of the System

Figure 1:
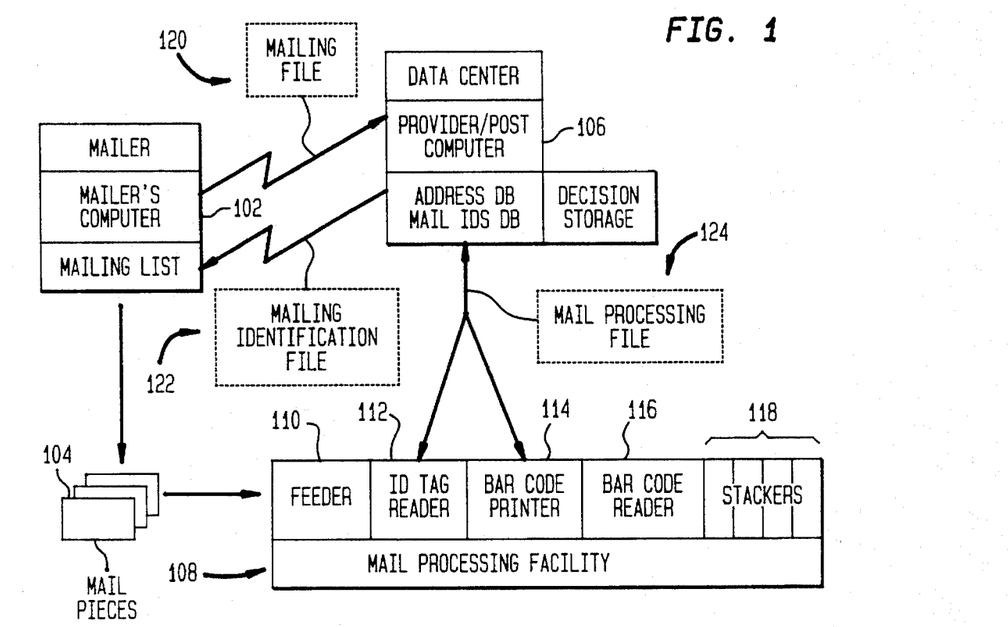
FIG. 1 is a block diagram of a mail processing system embodying the present invention and showing a mailer facility, a data center facility and a mail processing facility.

Reference is now made to FIG. 1. A mailer's computer 102 generates a mailing list of mailpieces 104 to be created at a later point in time and to thereafter be submitted to a carrier service for delivery to an addressee. The mailer's computer 102 is in communication with the data center computer 106 of a carrier service or a trusted third party. The data center computer 106 includes an address database and a mail identification database. The function of these databases will be described in greater detail hereinafter. The computer program which accesses the address database and the mail identification database is stored in a secure decision storage location which may be part of the data center. A decision storage location is the hardware and software that is accessed by mail processing equipment to provide address data and authorization. The data center computer is in communication with the mail processing facility equipment 108. This equipment includes a mail feeder 110, an identification tag reader 112, a barcode printer 114, a barcode reader 116, and various sorter stackers shown generally at 118.

In general operation, the mailer's computer 102 transmits a mailing file shown generally at 120 to the data center computer 106. The data center computer 106 generates a mailing identification file shown generally at 122 after processing the mailing file 120.

After receiving the mailing file 120 the mailpieces 104 are prepared at the mailer or other facility using the information from the mailing identification file which includes a unique identifier such as an identification number (ID tag) associated with each mailpiece which is printed thereon. The mailpieces 104 are then prepared and delivered to the carrier service for further processing.

Figure 2:
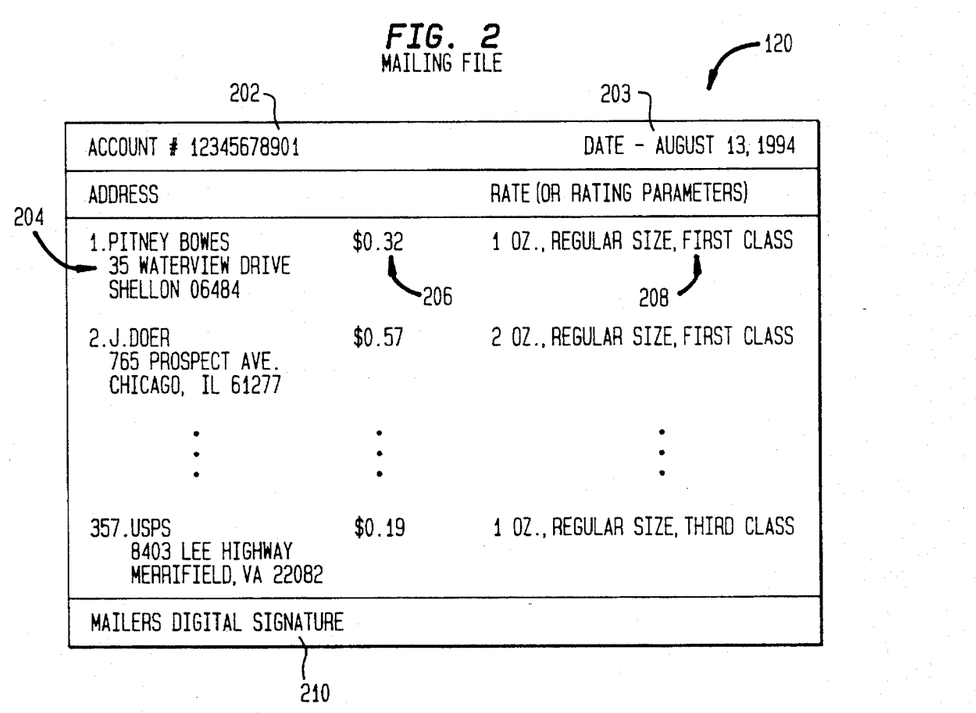
FIG. 2 is a mailing file of data that is sent by the mailer's computer to the carrier service party data center.

Reference is now made to FIG. 2. The mailing file 120 includes the mailer account identification number 202, a date 203 and a list of mailpieces to be prepared for various recipients shown generally at 204. The mailing list includes mailpieces numbered 1 through 357 each going to a particular addressee or destination. Associated with each of the mailpieces is the postal rate 206 and/or postal rating parameters 208. The rate and/or rating parameters are identified for each of the addresses on the mailing list. As is seen from mailing file 120, the pieces shown include a one ounce regular size first class item for address 1 at $.32; a two ounce regular size first class for address 2 at $.57; and, a one ounce regular size third class for address 357 at $.19. The mailer's digital signature is also provided at 210.

It should be understood, of course, that the form and format of the rating parameters and/or the rate for the carrier service vary depending upon the country and the carrier service involved and also, as for example, the period of time involved.

Figure 3:
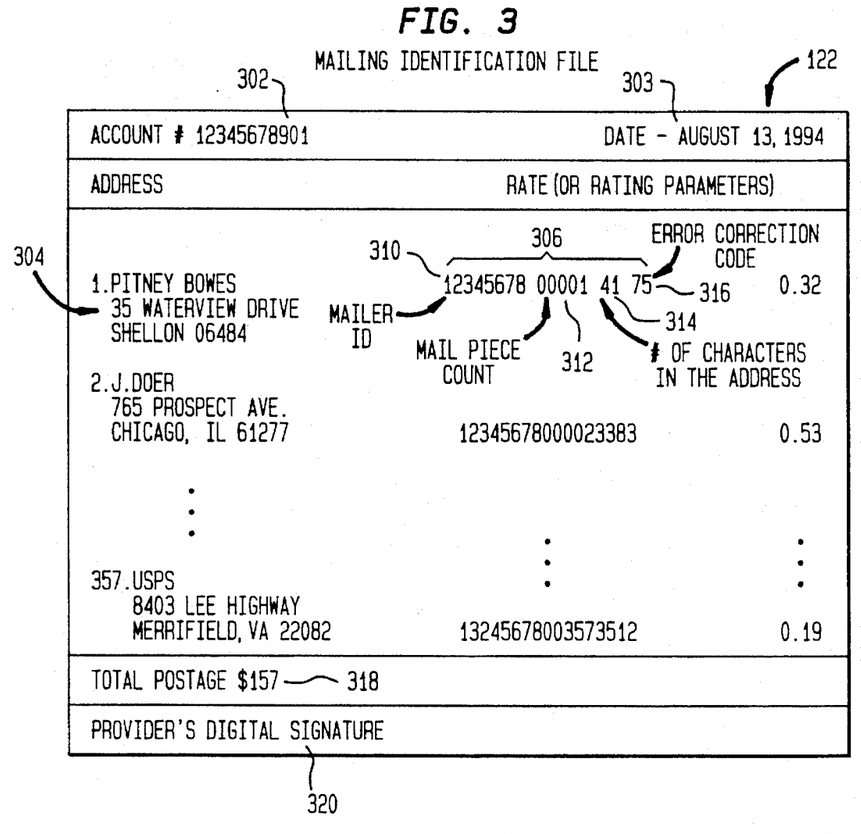
FIG. 3 is a mail identification file of data that is sent by the carrier data center to the mailer's computer.

Reference is now made to FIG. 3. Mailing identification file 122 includes the mailer account number 302, the date of the mailing identification file shown at 303, a list of addresses shown generally at 304, a unique number 306 is associated with each address as well as the postage rate for the address shown at 308. A unique identification number 306 is associated with each of the addresses 1 through 357 listed in the mailing identification file 122. This unique identifier, here, an identification number (or a smaller portion of it unique to the mailpiece) is the identification tag to be printed on the mailpiece. The unique identification number 306 is comprised, for example, of: the mailer's identification 310, the mailpiece count 312, the number of characters in the address 314 (excluding spaces and punctuation marks) and an error correction code 316. Thus, for each mailpiece the following information is printed: the address, the mailer identification number 310, a sequential piece count number 312, the number of characters in the address 314, and an error correction code 316. By using this data a unique identifier is thus associated with each and every address on the mailing identification file 122. The mailing identification file further includes the total postage 318 charged to the mailer as well as the digital signature 320 of the carrier or trusted third party.

Figure 4:
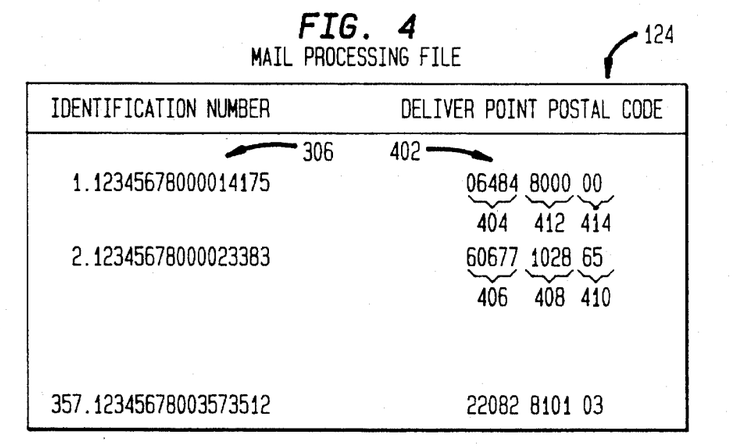
FIG. 4 is a mail processing file of data that is sent by the carrier data center computer to the mail processing equipment at the mail processing facility.

Reference is now made to FIG. 4 which is the mail processing file shown generally at 124. The mail processing file 124 includes both an identification number 306 associated with each of the addresses 1 through 357 and a delivery point postal code 402. The identification number 306 is the same as the identification number 306 in the mailing identification file 122. The delivery point postal code 402 however, is a new code generated by the carrier service as will be explained hereinafter. This is generated as a result of processing the mailing file 120 address list for each of the addresses in the mailing file.

As an example, it should be noted that the ZIP code for address 1 on the mailing file 120 is 06484 and corresponds to the five digit ZIP code portion 404 of delivery postal code 402 for address 1; however, this is not the case with address 2. With respect to address 2, the ZIP code of 61277 on the mailing file 120 has been changed to a new five digit delivery ZIP code 406, specifically, to 60677. This is a result of an address hygiene operation by the carrier service. The remaining portion of the delivery postal code, as for example, for address 2 includes the four digit add-on 408 and the last two digits of the street number 410. Thus, the postal delivery code, here one suitable for the United States, includes the five digit ZIP code 406, the four digit add-on 408 and the last two digits of the addressee street range. From this information the carrier route and the carrier sequence can be computed, and if wished, included as part of the mail processing file 124. With respect to address 1 on the mail identification list, the four digit add-on 412 is a post office box number and this is indicated by the street address range 00 at 414.

It should be expressly recognized that other forms of delivery point postal codes which are destination delivery codes can be employed depending upon the carrier involved, the country involved and the system involved. In its broadest sense the destination delivery code is destination address information which assists a carrier service in sorting and/or deliverying mailpiece. The factor of importance, however, is that by using the mailing file 120 the carrier or trusted third party develops a delivery point postal code 402 for each address on the mailing list that greatly facilitates processing and delivery of the mail. Where possible, the delivery point postal code should be suitable to uniquely identify every delivery address.

Figure 5:
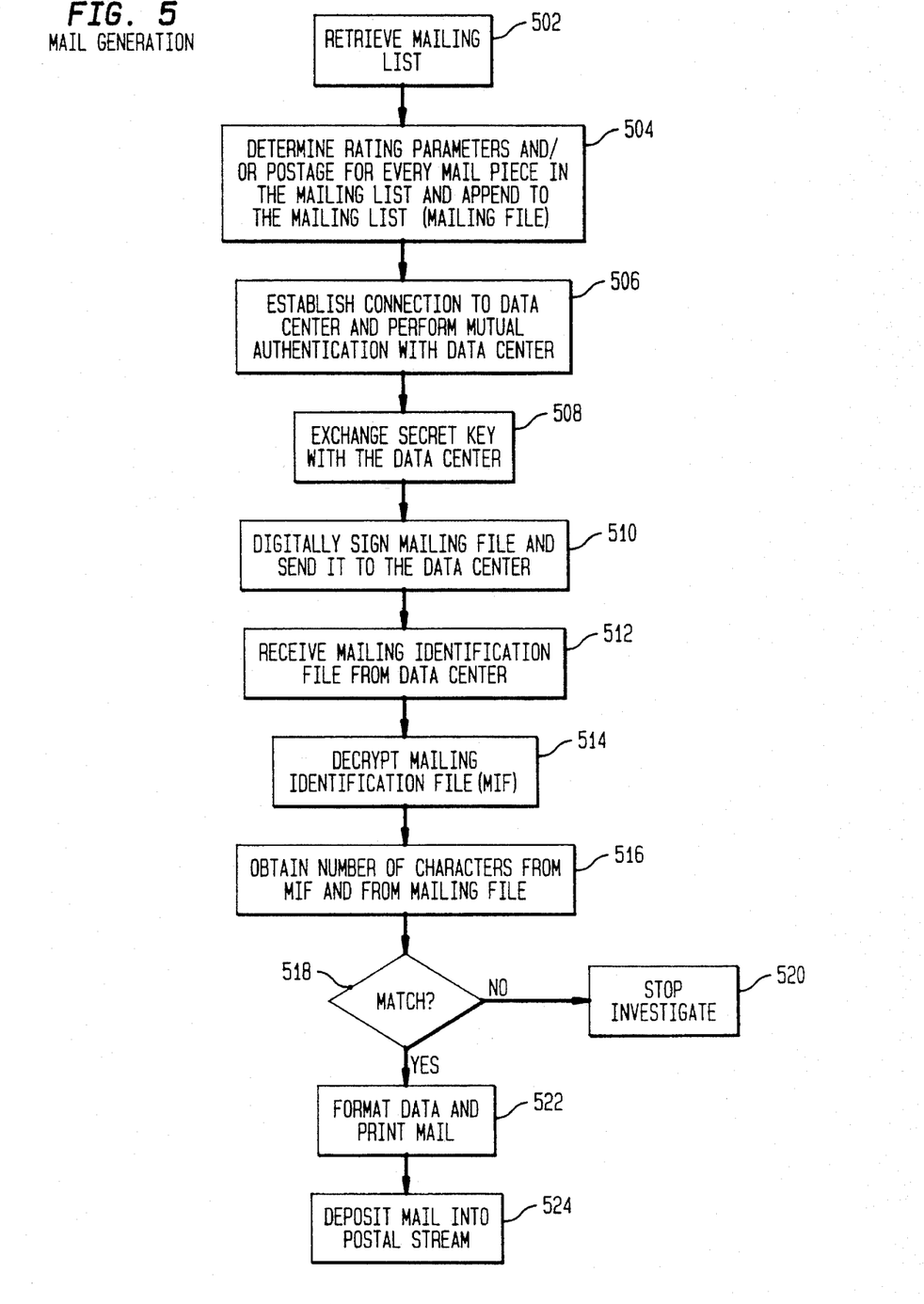
FIG. 5 is a flow chart of the operation at the mailer's facility in mail generation.

Reference is now made to FIG. 5. In generating the mailpieces 104, the mailer either retrieves or creates a mailing list at 502. Rating parameters and/or postage is determined for every mailpiece in the mailing list and appended to the mailing list at 504. Communications is then established with the data center and the mutual authentication is performed with the data center at 506. The mailer and data center then exchange the mutual session secret key for data and privacy protection. The mailer digitally signs the mailing file and sends it to the data center at 510. Thereafter, the mailer receives the mailing identification file from the data center at 512 and decrypts the mailing identification file at 514 using the secret key that was exchanged at 508. The number of characters from the mail identification file and from the mailing file are obtained for each address at 516 and compared at 518. If a match is not obtained, the process is stopped and a determination is made as to the cause of the mismatch at 520. If a match is obtained, however, the data is formatted and the mail is printed at 522. Thereafter, the mail is deposited into the postal stream at 524 by the mailer.

Figure 6:
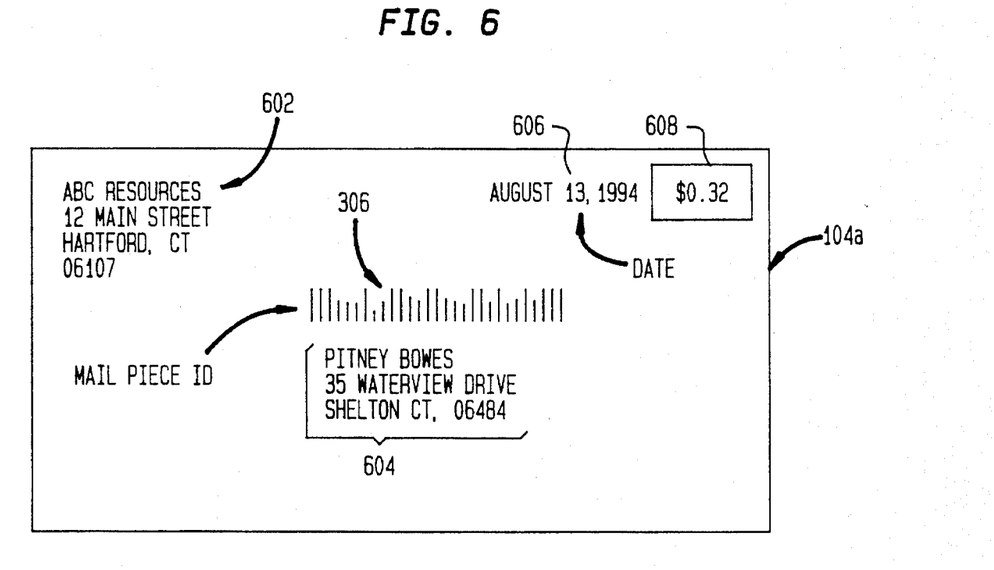
FIG. 6 is a mailpiece layout resulting from the mail process generation at the mailer's location and embodying aspects of the present invention.

Reference is now made to FIG. 6. A mailpiece 104*a* has printed on it a return address 602 and a delivery address 604. Also printed on the mailpiece is the unique mailpiece identifier, identification number 306, in a machine readable form, in human readable form or a combination thereof. Additional information may also be imprinted on the mailpiece such as the date as is shown at 606 and/or the postage amount at 608.

Other information such as the rating parameters that went into rating the mail and graphics may also be imprinted on the mailpiece as well any special conditions or endorsements, such as certified mail, express mail, registered mail and the like.

Figure 7:
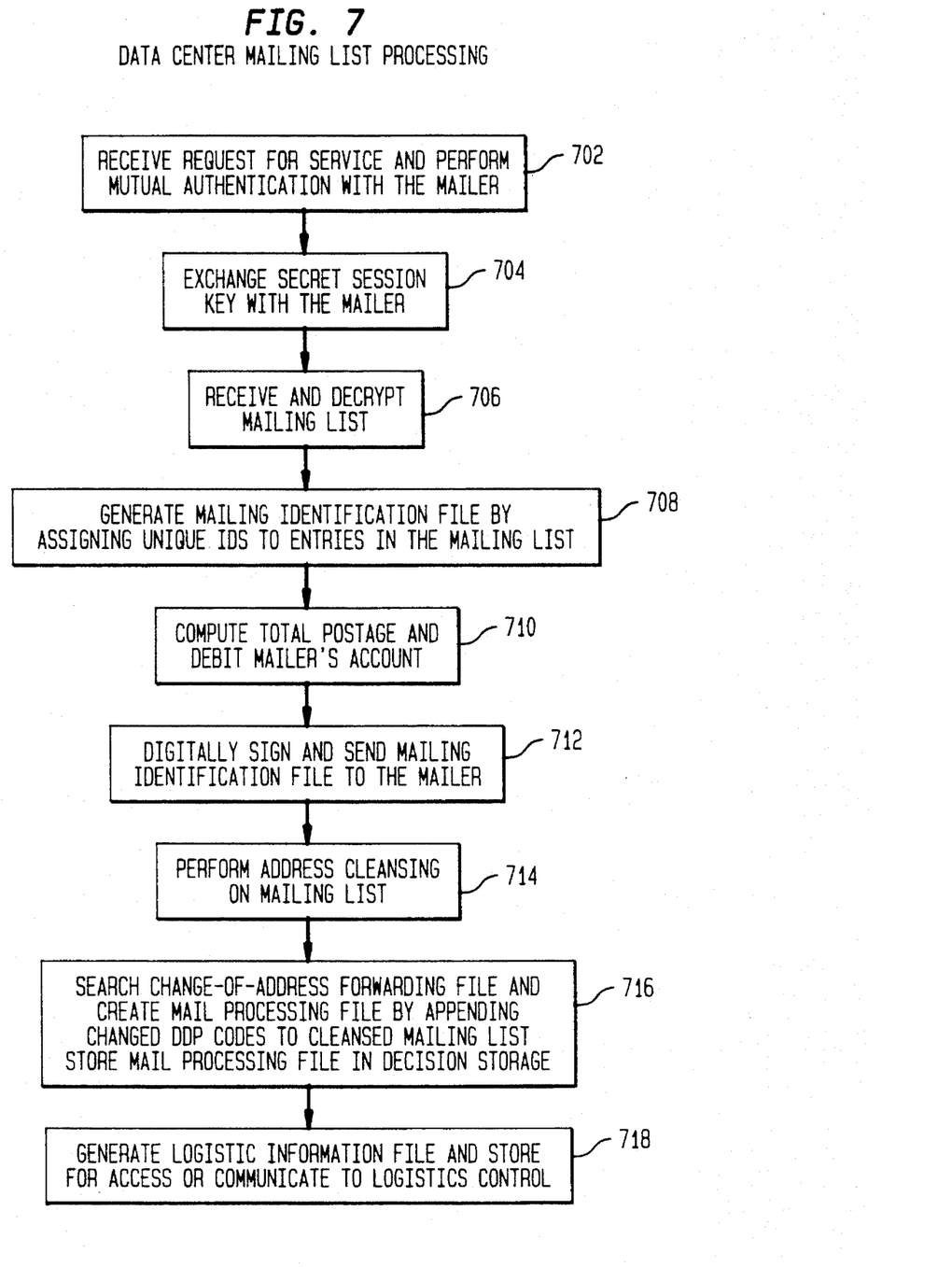
FIG. 7 is a flow chart of the operation of the mailing list processing at the carrier data center.

Reference is now made to FIG. 7. The data center receives a request for service and provides mutual authentication with the mailer at 702. The secret session key is exchanged with the mailer at 704. The mailing list is received from the mailer and decrypted at 706 using the secret session key. Thereafter, the mailing identification file is generated by assigning unique identification numbers (ID tags), to each entry or address in the mailing list at 708. The total postage is computed and debited from the mailer's account at 710. This can involve off line credit authentication, funds transfer and/or a number of other financial processes associated with obtaining payment or guaranteeing future payment for the carrier services rendered. The carrier service or trusted third party data center then digitally signs and sends the mailing identification file to the mailer at 712.

A number of the process steps described hereinafter can be done prior to sending the mail identification file to the mailer. However, to the extent it is desired to perform this process off line or to provide the service only upon request and payment by the mailer, it can be performed after or without being sent to the mailer when the mailing identification file is communicated.

Accordingly, the data center performs address cleansing or hygiene on the mailing list at 714. The search of change of address forwarding files is also conducted at 716. This may involve a creation of a mail processing file by appending changed delivery point postal codes to the cleansed mailing list. The information is stored as part of the mail processing file in the decision storage of the carrier service data center computer. The Logistics Information File may also be generated and stored for access or communications to logistic control at 718 for logistic and load planning.

Figure 8:
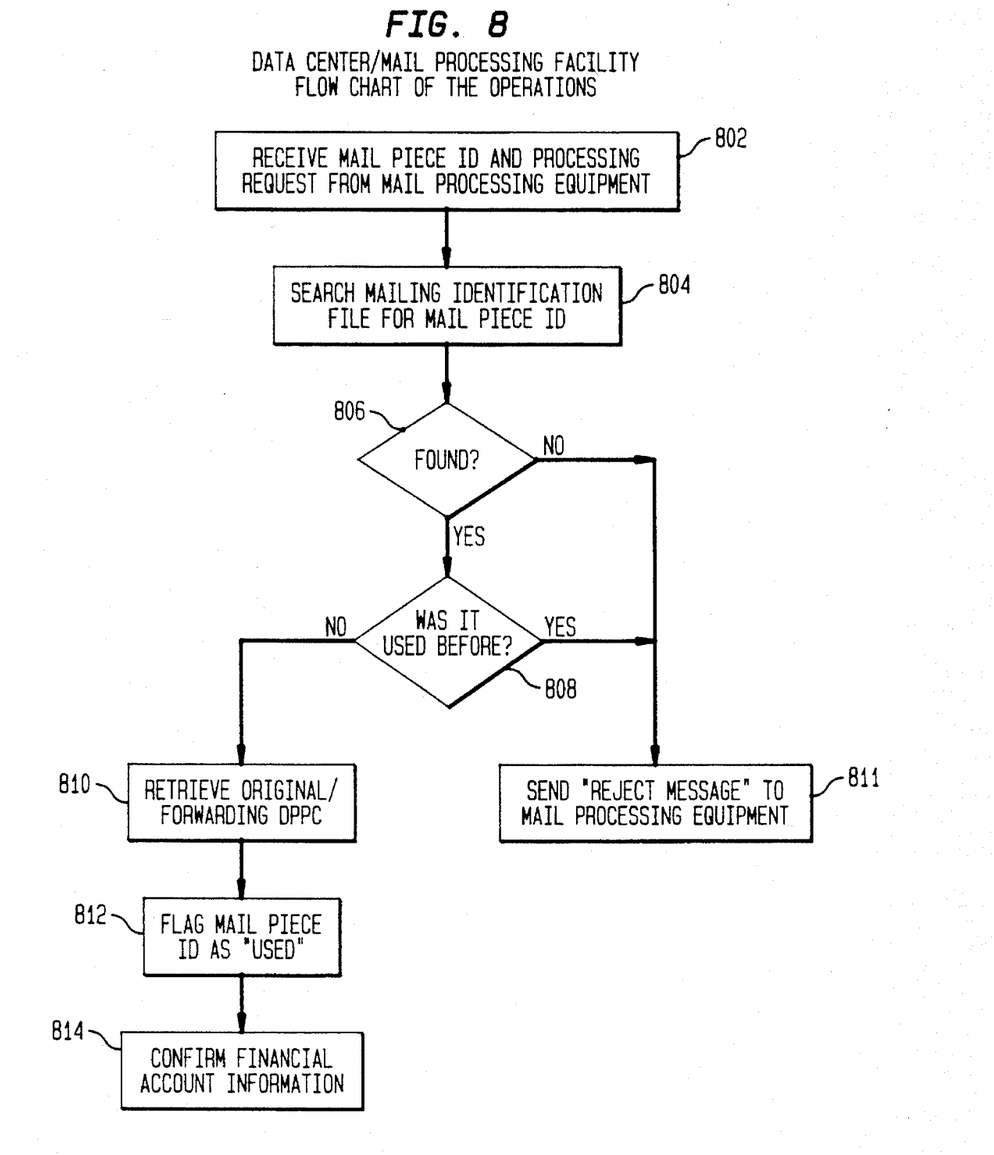
FIG. 8 is a flow chart of the operation at the carrier data center computer during the operation at the remote (or local) mail processing facility when mail is being processed.

Reference is now made to FIG. 8. While the mail is being processed at the mail processing facility, the carrier or trusted third party data center receives the mailpiece identification number and processing request from a mail processing equipment at 802. This initiates a search of the mailing identification file for the unique mailpiece identification at 804. Thereafter a determination is made if the unique mailing identification number is found at 806 and the process continues to determine whether the number was used before at 808. If, however, the unique identification number is not found, a reject message is sent to the mail processing equipment at 810. At 808 if the unique identification number was not used before, the delivery point postal code is retrieved at 810. Additionally, if a forwarding change of address code is involved, it is also retrieved at 810. At this point in time a mailpiece flag is set or other indication for the unique identification code as being used at 812. If at 808 the unique identification code was used before, a reject message is sent to the mail processing equipment at 811.

Finally, after the flag is set at 812, a confirmation of financial accounting information and/or account debiting is conducted at 814. At this point the carrier service and mailer may agree that the mail is deemed to have been processed and funds transfer can be implemented.

Figure 9:
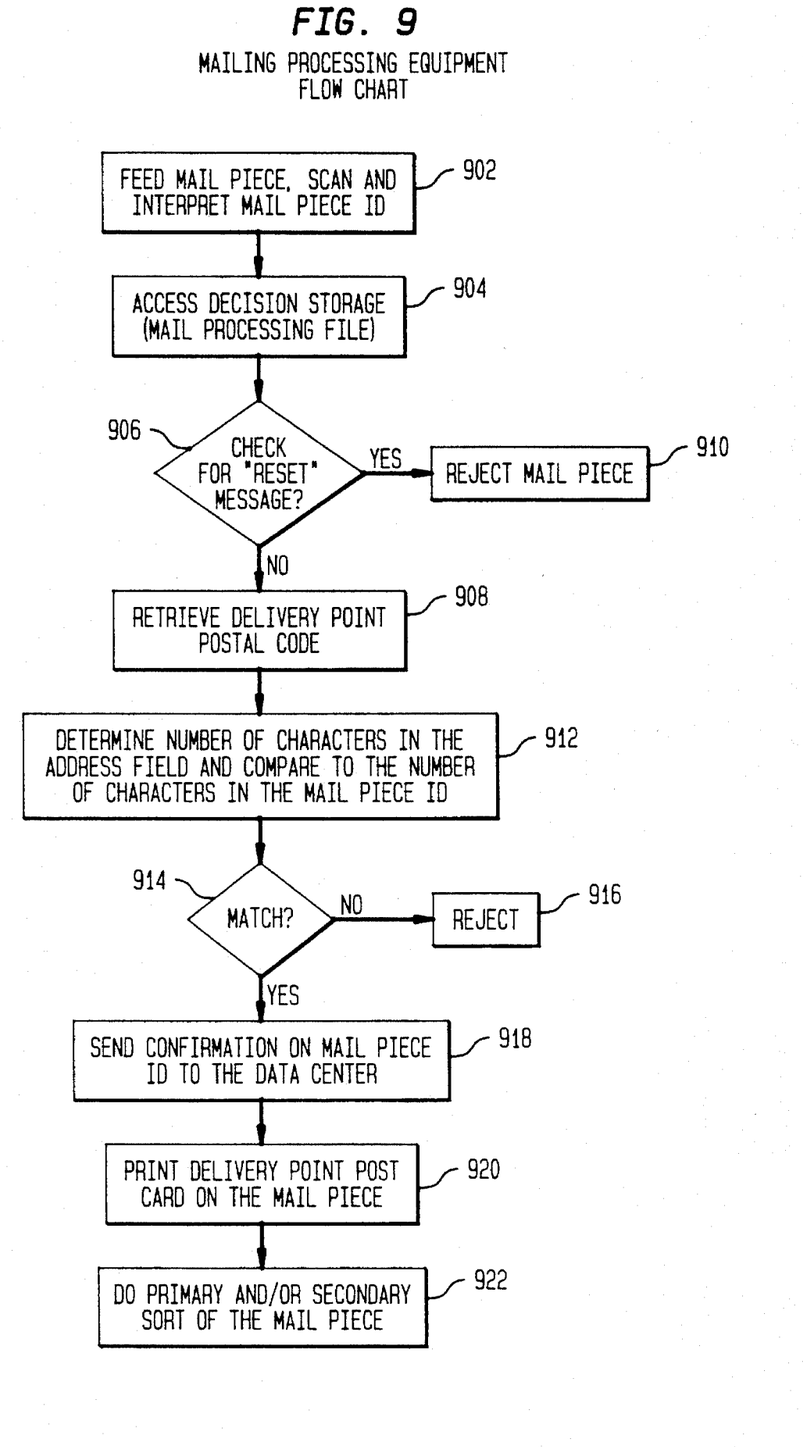
FIG. 9 is a flow chart of the operation of the mail processing equipment at the mail processing facility; and, FIG. 10 is a mailpiece layout after processing by the mail processing equipment and embodying further aspects of the present invention.

Reference is now made to FIG. 9. The mail processing equipment involves feeding the mailpiece, scanning and interpreting the mailpiece unique identification number at 902. The decision storage at the data center, and more particularly, the mail processing file is accessed at 904. A determination is then made at 906 for reject messages. If no reject message is received, the delivery point postal code is retrieved at 908. If a reject message exists, the mailpiece is rejected at 910.

If desired, for additional synchronization, a determination may be made of the number of characters in the address field to thereafter be compared to the number of characters in the mailpiece identification at 912. If a match is not found to exist, the mail may be rejected at 916. If a match occurs, a confirmation on the mailpiece identification is sent to the data center at 918. The delivery point postal code may thereafter be printed on the mailpiece at 920 and the primary sort and/or secondary sorts are conducted on the mailpiece at 922. It should be noted that a sorting action can be taken without imprinting the mailpiece.

Figure 10:
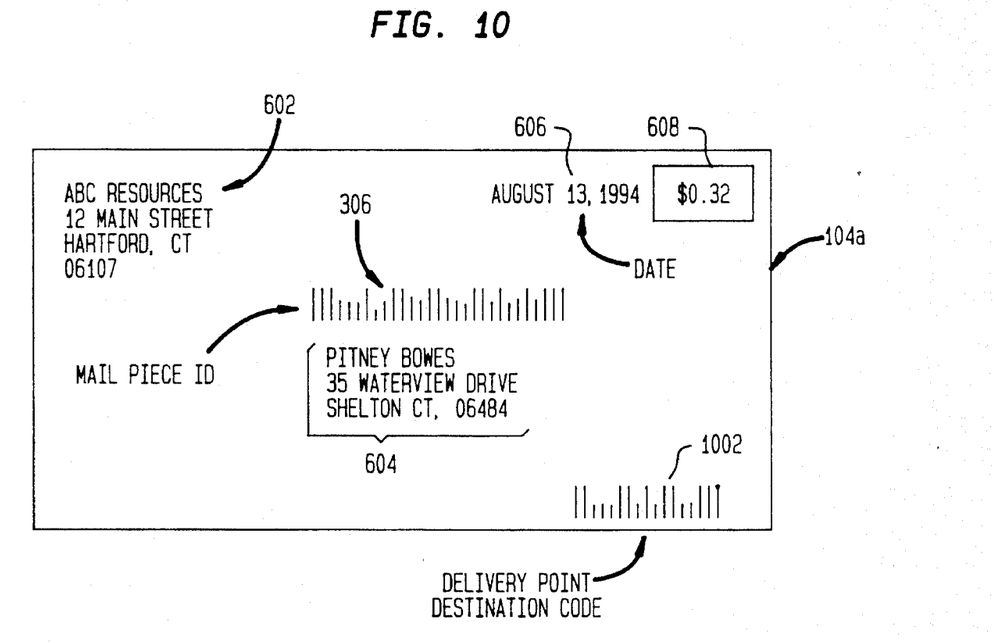

Reference is now made to FIG. 10. All of the information from FIG. 6 remains imprinted on the mailpiece; however, additionally imprinted on the mailpiece 104a is the delivery postal code associated with the particular mailpiece at 1002.

While the present invention has been disclosed and described with reference to the disclosed embodiments thereof, it will be apparent, as noted above, that variations and modifications may be made therein. As an example, under certain circumstances the delivery point postal code may be transmitted to the mailer along with the unique mailpiece identifier. As another example, communications between the mailer and the carrier service may be by way of hand delivery of computer storage devices (disks, tapes, etc. ). It is, thus, intended in the following claims to cover each variation and modification that falls within the true spirit and scope of the present invention.

What is claimed is:

1. A method for processing mail, comprising the steps of:
    creating a mailing list including destination addresses for mailpieces to be submitted to a carrier service for delivery;
    generating a unique mailpiece identifier associated with each of the mailpieces on said mailing list;
    printing each said unique mailpiece identifier on the mailpiece with which it is associated;
    submitting the mailpieces with the unique mailpiece identifier printed thereon to said carrier service;
    processing said mailpiece to obtain said unique mailpiece identifier; and,
    utilizing said obtained unique mailpiece identifier from each said mailpiece to obtain a destination delivery code.

2. The method of claim 1 wherein the step of generating the unique mailpiece identifier is performed be the carrier service.

3. The method of claim 1, comprising the further step of:
    said carrier service debiting an account associated with the mailer for the carrier services to be rendered based on said mailing list.

4. The method of claim 1, comprising the further step of:
    printing on said mailpiece the destination delivery code.

5. The method of claim 1, comprising the further step of:
    noting in said carrier service records when a unique mailpiece identifier has been obtained from a mailpiece to prevent reuse of the unique mailpiece identifier associated with said mailpiece.

6. The method of claim 1, comprising the further step of:
    conducting address cleansing of the address on said mailing list and generating said destination delivery code based on said cleansed address of the addresses on said mailing list.

7. The method of claim 1, comprising the further step of:
    performing change of address search and replacement for the addresses on said mailing list and generating said destination delivery code based on said replaced addresses.

8. The method of claim 1, comprising the further step of:
    conducting address cleansing of the address as on said mailing list and performing change of address search and replacement for the addresses on said mailing list; and,
    generating said destination delivery code based on said cleansed and replaced address.

9. The method of claim 1, comprising the further step of:
    generating synchronizing data for each address on said mailing list for use in determining synchronization between said unique mailpiece identifier associated with mailpieces on said mailing list and said destination delivery code associated with mailpieces on said mailing list.

10. A method for processing mail, comprising:
    creating a mailing list by a mailer including destination addresses for mailpieces to be submitted to a carrier service for delivery;
    establishing a data connection between said mailer and a carrier service data center;
    performing mutual authentication for said mailer and said carrier service data center;
    exchanging secret session keys between said mailer and said carrier service;
    said mailer digitally signing said mailing list;
    said mailer encrypting said digitally signed mailing list with said secret session key;
    said mailer transmitting said encrypted digitally signed mailing list to said carrier service data center;
    receiving at said carrier service data center said encrypted digitally signed mailing list;
    decrypting said received encrypted mailing list at said data center;
    generating at said carrier service data center a list of unique mailpiece identifiers associated with mailpieces on said mailing list;
    determining at the carrier service data center the carrier service charges for delivering said mailpieces on said mailing list to said destination addresses;
    said carrier service debiting an account associated with said mailer for said determined carrier service charges;
    said carrier service digitally signing said generated unique mailpiece identifiers associated with mailpieces on said mailing list;
    said carrier service encrypting with said secret session key said digitally signed generated list of unique mailpiece identifiers associated with mailpieces on said mailing list;

said carrier service transmitting to said mailer said encrypted digitally signed list of unique mailpiece identifiers associated with mailpieces on said mailing list;

performing address cleansing at said carrier service data center on said received decrypted mailing list;

performing change of address search and replacement for the addresses on said received decrypted mailing list;

said carrier services generating a destination delivery code for each mailpiece on said mailing list based on the cleansed and replaced list of addresses;

printing by said mailer each said unique mailpiece identifier on the mailpiece with which it is associated;

said mailer submitting the mailpieces with the printed unique identifier to said carrier service for delivery of each of said mailpieces to the mailpiece addressee;

said carrier service obtaining from said mailpiece said printed unique identifier; and, said carrier service utilizing said obtained unique identifier from each said mailpiece to obtain from said carrier service data center said destination delivery code for said mailpieces delivered to said carrier service.

11. A system for processing mail, comprising:

means for creating a mailing list including destination addresses for mailpieces to be submitted to a carrier service for delivery;

means for generating a unique mailpiece identifier associated with each of the mailpieces on said mailing list;

means for printing each said unique mailpiece identifier on the mailpiece with which it is associated;

means for submitting the mailpieces with the printed unique mailpiece identifier to said carrier service;

means for obtaining from said mailpiece said printed unique mailpiece identifier; and, means for utilizing said obtained unique mailpiece identifier from each said mailpiece to obtain a destination delivery code.

12. The system of claim 11, further comprising:

means for debiting an account associated with the mailer for the carrier services to be rendered based on said mailing list.

13. The system of claim 11 wherein said means for generating said unique mailpiece identifier is controlled by the carrier service.

14. A system for processing mail, comprising:

means for creating a mailing list including destination addresses for mailpieces to be submitted to a carrier service for delivery;

means for establishing connection between said mailer and a carrier service data center;

means for performing mutual authentication for said mailer and said carrier service data center;

means for exchanging secret session keys between said mailer and said carrier service;

means for digitally signing said mailing list by said mailer;

means for said mailer encrypting said digitally signed mailing list with secret session key;

means for transmitting said encrypted digitally signed mailing list by said mailer to said carrier service data center;

means for receiving at said carrier service data center said encrypted digitally signed mailing list;

means for decrypting said receive encrypted mailing list at said data center;

means for generating at said carrier service data center a list of unique mailpiece identifiers associated with mailpieces on said mailing list;

means for determining at said carrier service data center the carrier service charges for delivery of said mailpieces on said mailing list to said destination addresses;

means for said carrier service debiting an account associated with said mailer for said determined carrier service charges;

means for said carrier service digitally signing at said carrier service data center said generated unique mailpiece identifier associated with mailpieces on said mailing list;

means for said carrier service encrypting at said data center with said secret session key said digitally signed generated list of unique mailpiece identifier associated with mailpieces on said mailing list;

means for said carrier service transmitting to said mailer said encrypted digitally signed list of unique mailpiece identifier associated with mailpieces on said mailing list;

means for said carrier service performing address cleansing at said carrier service data center on said received decrypted mailing list;

means for said carrier service generating a destination delivery code for each mailpiece on said mailing list based on the cleansed and address corrected list of addresses;

means for printing by said mailer each said unique mailpiece identifier on the mailpiece with which it is associated;

means for said mailer submitting to said carrier service the mailpieces with the printed unique identifier;

means for said carrier service obtaining from said mailpiece said printed unique identifier; and, means for said carrier service utilizing said obtained unique identifier from each said mailpiece to obtain from said carrier service data center said destination delivery code for mailpieces delivered to said carrier service.

* * * * *